United States Patent
Gruhlke (10) Patent No.: US 6,768,834 B1
(45) Date of Patent: Jul. 27, 2004

(54) SLAB OPTICAL MULTIPLEXER

(75) Inventor: Russell W. Gruhlke, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/461,057

(22) Filed: Jun. 13, 2003

(51) Int. Cl.[7] ............................. G02B 6/28; H04J 14/02; H01L 21/00
(52) U.S. Cl. ............................. 385/24; 385/37; 385/14; 385/129; 385/130; 385/131; 385/31; 385/47; 398/79; 398/84; 398/87; 438/29; 438/31; 438/32
(58) Field of Search ........................... 385/24, 37, 14, 385/129, 130, 131, 31, 33, 47; 398/79, 84, 87; 438/26, 27, 29, 31, 32

(56) References Cited

U.S. PATENT DOCUMENTS

| | | | |
|---|---|---|---|
| 4,776,661 A | * 10/1988 | Handa | 385/37 |
| 5,894,535 A | 4/1999 | Lemoff et al. | 385/47 |
| 6,081,331 A | * 6/2000 | Teichmann | 356/328 |
| 6,198,864 B1 | 3/2001 | Lemoff et al. | 385/47 |
| 6,289,155 B1 | * 9/2001 | Wade | 385/37 |
| 6,334,014 B1 | * 12/2001 | Nitta et al. | 385/39 |
| 6,404,958 B1 | * 6/2002 | Boye et al. | 385/47 |
| 6,553,162 B1 | * 4/2003 | Okayama | 385/37 |
| 6,636,658 B2 | * 10/2003 | Goodman et al. | 385/24 |
| 2002/0154857 A1 | * 10/2002 | Goodman et al. | 385/24 |
| 2003/0002789 A1 | * 1/2003 | Boye et al. | 385/31 |
| 2003/0223687 A1 | * 12/2003 | Blomquist et al. | 385/37 |

* cited by examiner

Primary Examiner—Brian M. Healy (57) ABSTRACT

A slab optical multiplexer comprises a slab substrate having two substantially flat and parallel surfaces, and internally propagating light beams. The multiplexer further comprises collimating/focusing optical elements and micro-diffractive optical elements each positioned on the surfaces in the light beams. At least one micro-diffractive optical element is positioned simultaneously in two separately incident and intersecting light beams, such that the two separately incident light beams are diffracted into a pair of co-propagating diffracted light beams.

25 Claims, 6 Drawing Sheets

SLAB OPTICAL MULTIPLEXER

TECHNICAL FIELD

This invention relates to optical communications technology, and particularly to a system and method for providing a slab optical multiplexer.

BACKGROUND OF THE INVENTION

Multiplexers are a common optical component of telecommunications technology. These devices receive a multiplicity of input optical beams having different wavelengths and superimpose them into a common optical output beam. Traditional multiplexing devices are typically based on prism/grating and refractive lens combinations, optical band-pass filters, or waveguide coupling. For free-space light propagation, prism/grating and refractive lens combination multiplexers are used. In such devices, the lens focuses multiple beams into a single output fiber. But a single collecting lens must be relatively large to intercept all beams of interest. Hence this scheme is difficult to miniaturize. Moreover, devices comprising multiple separate optical components require difficult and time-consuming optical alignment.

BRIEF SUMMARY OF THE INVENTION

In a first embodiment disclosed herein, a slab optical multiplexer is provided. The multiplexer comprises a slab substrate having two substantially flat and parallel surfaces, and internally propagating light beams. The multiplexer further comprises collimating/focusing optical elements and micro-diffractive optical elements each positioned in the light beams on the surfaces. At least one micro-diffractive optical element is positioned simultaneously in two separately incident and intersecting light beams, such that the two separately incident light beams are diffracted into a pair of co-propagating diffracted light beams.

In another embodiment disclosed herein, a method of multiplexing input light beams of differing wavelengths is provided. The method comprises providing a slab of material comprising opposed major surfaces, and receiving externally incident input light beams of differing wavelengths. The method further comprises diffracting two externally incident light beams at major surfaces of the slab into a superimposed pair of co-propagating diffracted light beams containing superimposed wavelength components of the two externally incident input light beams.

In yet another embodiment disclosed herein, a method of fabricating a slab optical multiplexer is provided. The method comprises providing a slab substrate of optically transmissive material, having flat and parallel opposing surfaces. The method further comprises forming micro-optical elements at the parallel surfaces, in which the micro-optical elements are selected from collimating/focusing elements and micro-diffractive optical elements.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Important goals in designing "next generation" telecommunications devices are miniaturization and cost reduction. Wafer-like devices fabricated using traditional VLSI fabrication techniques are well-suited to accomplish both goals. The disclosed embodiments provide a multiplexing device comprising gratings and collimating/focusing elements fabricated on a thin, planar substrate. Advantageously, the slab optical multiplexer has a wafer-like geometry, and therefore can be fabricated according to traditional VLSI batch processing techniques, facilitating size and cost reduction, and thus becoming a candidate "next generation" optical multiplexing component. Moreover, VLSI technology defines optical positioning and alignment by a photomask, thus efficiently providing alignment of multiple optical components in a single mask alignment process.

Figure 1A:
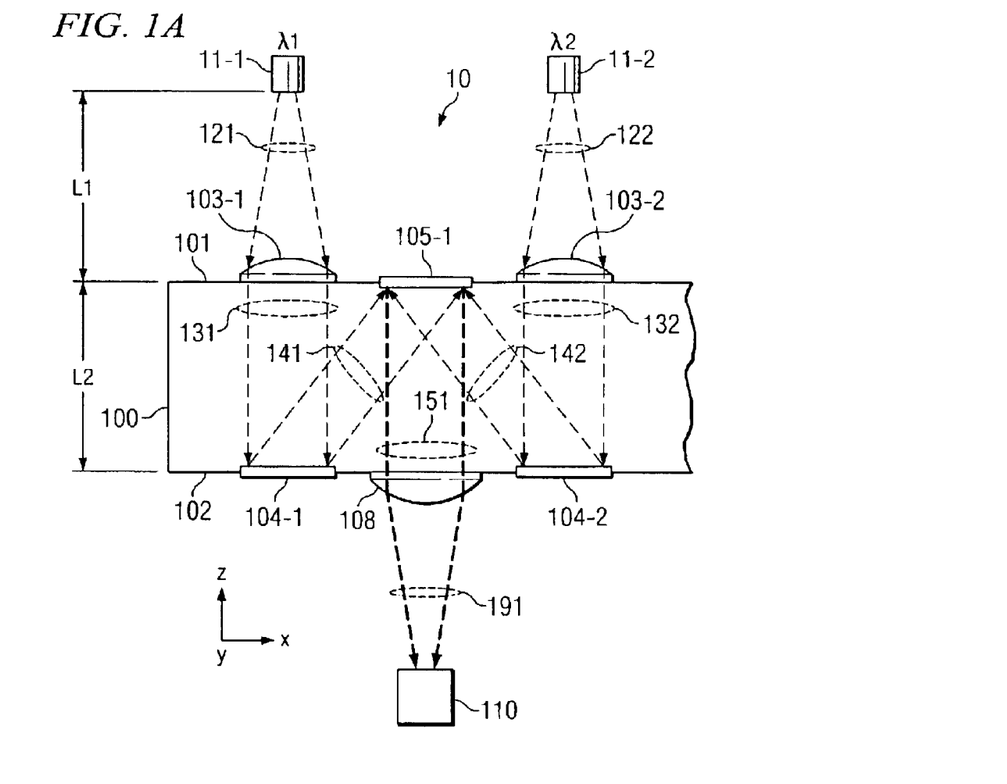
FIG. 1A is a schematic diagram illustrating a simplified example of multiplexing two input optical beams using a segment of a slab optical multiplexer, in accordance with the disclosed embodiments.

FIG. 1A is a schematic diagram illustrating a simplified example of multiplexing two input optical beams using a segment of slab optical multiplexer 10, in accordance with the disclosed embodiments. Slab optical multiplexer 10 is fabricated on slab substrate 100 of thickness L2 in the z-direction between substantially parallel polished surfaces 101 and 102. Slab substrate 100 provides both an optically transmissive propagation medium and a fabrication surface for micro-optical elements, including, for example, collimating/focusing elements, for example lenses 103-1, 103-2, and 108, and micro-diffractive optical elements, for example gratings 104-1, 104-2, and 105-1. Depending on the range of wavelengths to be multiplexed, slab substrate 100 and/or the micro-optical elements can be made of any suitable optically transmissive material, for example, glass, optical grade polymer, silicon (Si), silicon dioxide ($SiO_2$), indium phosphide (InP), and/or gallium arsenide (GaAs). Slab thickness L2 generally has sub-millimeter dimensions, typically about 500 micrometers ($\mu$m). Surface dimensions of slab substrate 100 in the x and y directions orthogonal to thickness L2, as illustrated by coordinate axes x, y, z, are generally in the range of a few millimeters (mm), depending on the number and wavelengths of beams to be multiplexed using slab optical multiplexer 10. Fabrication of slab optical multiplexer 10 is accomplished using, for example, traditional wafer-polishing and microelectronic fabrication techniques.

A collimating/focusing element can be formed, for example, by: 1) depositing a layer of resist on surface 101, 102 of slab substrate 100; 2) exposing the resist layer through a patterned mask, producing a cylindrical resist "post"; 3) flowing the resist "post" to form a substantially hemispherical surface or mound of resist; and 4) transferring the hemispherical or mound shape into the underlying slab substrate surface, for example using an anisotropic etch process. Alternatively, the patterned resist can remain in place on the slab substrate surface, either cured or uncured, and serve as a collimating/focusing element. In yet another alternative fabrication process, a plastic layer is applied to the slab surface and is stamped by a die to transfer a replica impression of the collimating/focusing element. In yet another fabrication process, an applied plastic layer is lithographically patterned, reflowed, and then optionally transferred to the slab substrate surface.

Similarly, a micro-diffractive grating can be formed, for example, by: 1) depositing a resist layer on the surface 101, 102, of slab substrate 100; 2) exposing the deposited resist layer through a patterned grating mask; 3) transferring the shape of the resulting grating-patterned resist into the underlying slab substrate, for example using an anisotropic etch process. For a blazed grating, mask-etch cycle (2–3) is typically repeated multiple times, at each repetition using a slightly different mask, thus forming a three-dimensional stepped profile that approximates a continuous blaze profile. As in the case of the collimating/focusing element, alternative fabrication processes for forming the micro-diffractive grating can involve leaving the patterned resist in place as the micro-diffractive grating, or stamping a replica impression of the micro-diffractive grating into an applied plastic layer using a transfer die. Again, as in the case of the collimating/focusing element, the applied plastic layer alternatively is lithographically patterned, reflowed, and then optionally transferred to the slab substrate surface.

Importantly, the photomask patterning process allows wafer-scale mass fabrication, pre-positioning, and pre-alignment of multiple micro-optical elements using a single photomask patterning and alignment operation.

In the example of FIG. 1A, two input beams 121 and 122 of respective wavelengths $\lambda_1$, $\lambda_2$ are received from respective sources 11-1 and 11-2. Sources 11-1 and 11-2 can be, for example, optical fibers or diode emitters, such as vertical-cavity surface-emitting lasers (VCSELs) or edge-emitting lasers. Input beams 121, 122 are incident on collimating elements, for example lenses 103-1 and 103-2, which collimate the individual input beams to form collimated beams, for example individual collimated beams 131 and 132 propagating into slab substrate 100. Distance L1 from sources 11-1, 11-2 to surface 101 of slab substrate 100 is generally in the range of 100 $\mu$m to 2,000 $\mu$m, and is typically about 500 $\mu$m.

In the example illustrated in FIG. 1A, collimated beams 131 and 132 propagate in the z direction and are individually incident on respective micro-diffractive gratings 104-1 and 104-2. There, individual collimated beams 131–132 are each diffracted predominantly into various diffractive orders m=0, ±1, ±2, ..., with various diffractive efficiencies. The propagation direction of the diffracted light beam is given by the grating equation:

$$\sin \theta = m\lambda/\Lambda,$$

where $\lambda$ is the wavelength of light, $\Lambda$ is the grating periodicity, and $\theta$ is the diffraction angle, i.e., the angle between the propagation direction of the diffracted light beam and the direction normal to the grating surface (z axis). In the example depicted in FIG. 1A, grating rulings are oriented in the y-direction perpendicular to the plane of the figure. In accordance with the grating equation above, diffraction angle $\theta$ varies according to the wavelength of light being diffracted. If grating periodicity $\Lambda_1$ of micro-diffractive grating 104-1 is appropriately chosen for input wavelength $\lambda_1$, then collimated beam 131 is diffracted by micro-diffractive grating 104-1 into diffracted beam 141 at a predetermined angle directed toward micro-diffractive grating 105-1. Similarly, collimated beam 132 at input wavelength $\lambda_2$ is diffracted by micro-diffractive grating 104-2 into diffracted beam 142 directed toward micro-diffractive grating 105-1.

At micro-diffractive grating 105-1, applying the same principles of diffraction that were described in connection with micro-diffractive gratings 104-1, 104-2, diffracted beam 141 is further diffracted into superimposed beam 151. In the example depicted in FIG. 1A, diffracted beam 141 is incident on micro-diffractive grating 105-1 at an oblique angle relative to the normal. Because of the reciprocity principle of diffraction, by appropriate selection of grating periodicity $\Lambda$ relative to wavelength $\lambda_1$ and the incident angle, diffracted beam 141 is further diffracted by micro-diffractive grating 105-1 to propagate in the z-direction normal to the surface of micro-diffractive grating 105-1. As illustrated in the particular example of FIG. 1A, micro-diffractive gratings 104-1 and 105-1 are parallel to one another, and thus the incident angle of diffracted beam 141 at micro-diffractive grating 105-1 is equal to the diffracted angle of diffracted beam 141 at micro-diffractive grating 104-1. Since wavelength $\lambda_1$ is also identical at both micro-diffractive gratings 104-1 and 105-1, then superimposed beam 151 will propagate in the z-direction parallel to collimated beam 131 if grating periodicity $\Lambda$ of micro-diffractive grating 105-1 is equal to grating periodicity $\Lambda_1$ of micro-diffractive grating 104-1. In addition to the above simple example, alternative geometric relationships can be devised.

Diffracted beam 142 is incident onto micro-diffractive grating 105-1 from a direction roughly symmetric to that of diffracted beam 141. Applying symmetry and reciprocity principles of diffraction, diffracted beam 142 is also further diffracted into superimposed beam 151, thus becoming superimposed upon further diffracted beam 141. In the particular example depicted in FIG. 1A, by appropriate selection of grating periodicity $\Lambda$ relative to wavelength $\lambda_2$ and to the incident angle, diffracted beam 142 is further diffracted by micro-diffractive grating 105-1 to propagate in the z-direction normal to the surface of micro-diffractive grating 105-1. As illustrated in the example of FIG. 1A, micro-diffractive gratings 104-2 and 105-1 are parallel to one another, and thus the incident angle of diffracted beam 142 at micro-diffractive grating 105-1 is equal to the diffracted angle of diffracted beam 142 at micro-diffractive grating 104-2.

Since wavelength $\lambda_2$ is slightly different from wavelength $\lambda_1$, and if additionally grating periodicity $\Lambda$ of micro-diffractive grating 104-2 is equal to grating periodicity $\Lambda_1$ of micro-diffractive gratings 104-1 and 105-1, then the incident angle of diffracted beam 142 at micro-diffractive grating 105-1 (equal to the diffracted angle of diffracted beam 142 at micro-diffractive grating 104-2) will likewise be slightly different from the incident angle of diffracted beam 141 at micro-diffractive grating 104-1 (equal to the diffracted angle of diffracted beam 141 at micro-diffractive grating 104-1). Nevertheless, diffracted beam 142 will be further diffracted by micro-diffractive grating 105-1 into superimposed beam 151, which accordingly comprises superimposed light of both wavelength components $\lambda_1$ and $\lambda_2$, and which co-propagates in the z-direction parallel to collimated beams 131 and 132. In addition to the above-described simple example, alternative geometric relationships can be devised. It should be noted, however, that micro-diffractive grating 105-1 cannot be blazed simultaneously for the incident angles of both diffracted beam 141 and diffracted beam 142. Consequently, there will be a compromise of efficiency due to diffractive losses into unwanted diffractive orders when beams 141 and 142 are superimposed by micro-diffractive grating 105-1.

Superimposed beam 151 is then processed by micro-optical element 108 to produce multiplexed beam 191, which comprises co-propagating superimposed light beams of both input wavelength components $\lambda_1$ and $\lambda_2$. In the example shown, micro-optical element 108 is a lens that focuses multiplexed beam 191 onto external optical element 110. External optical element 110 is, for example, an output optical fiber or optical detector. Multiplexed beam 191 has a numerical aperture value nearly equal to that of each input beam 121–122. Alternatively, multiplexed beam 191 may emerge unfocused onto an external optical element as a collimated output beam, or may be further processed prior to emerging from slab optical multiplexer 10.

Figure 1B:
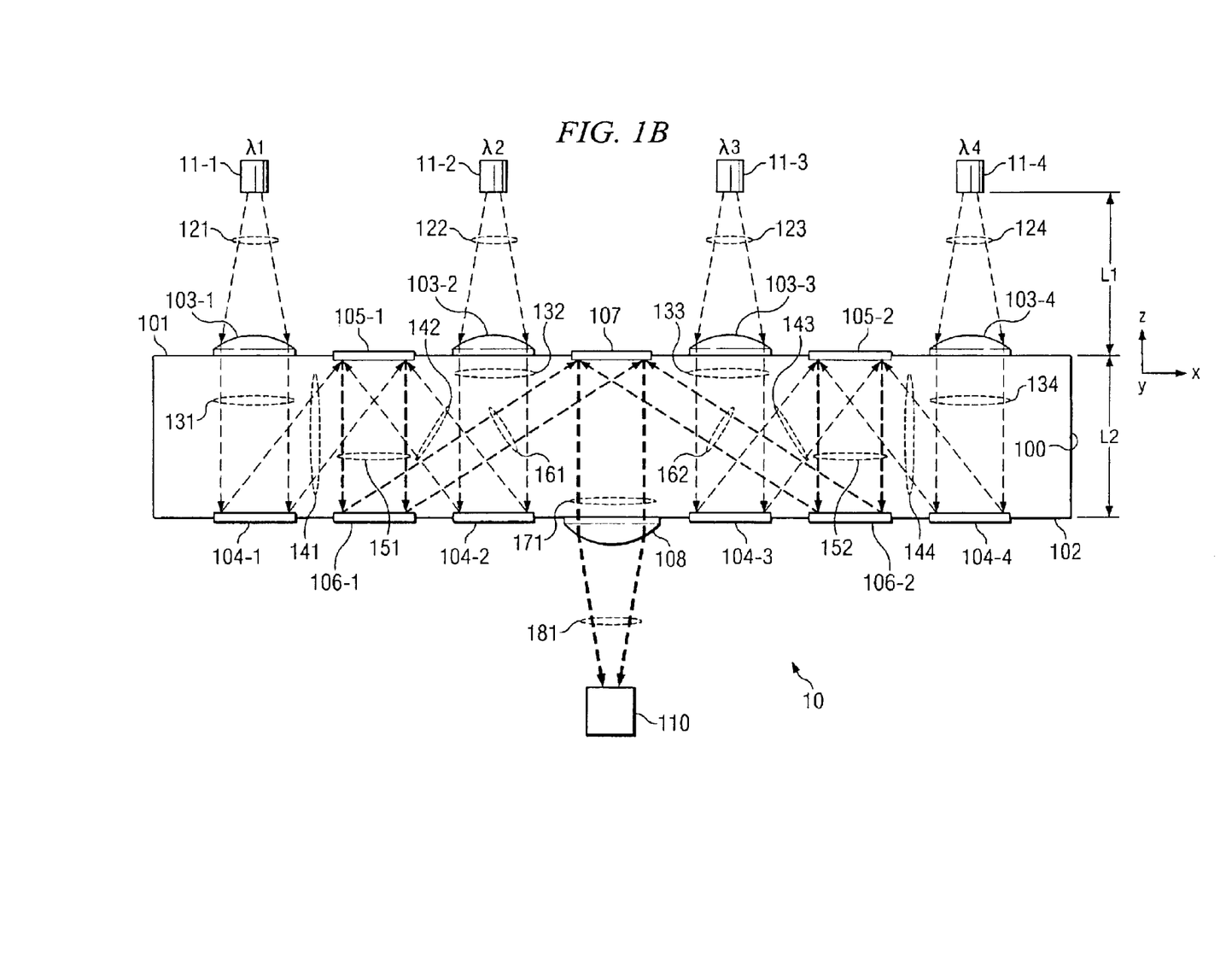
FIG. 1B is a schematic diagram illustrating an example of multiplexing extended to four input optical beams using slab optical multiplexer, in accordance with the disclosed embodiments.

FIG. 1B is a schematic diagram illustrating an example of multiplexing extended to four input optical beams using slab optical multiplexer 10, in accordance with the disclosed embodiments. Slab optical multiplexer 10 is fabricated on slab substrate 100 of thickness L2 in the z-direction between substantially parallel polished surfaces 101 and 102. Slab substrate 100 provides both an optically transmissive propagation medium and a fabrication surface for micro-optical elements, including for example collimating/focusing elements, for example lenses 103-1, . . . , 103-4, and 108, and micro-diffractive optics, for example gratings 104-1, . . . , 104-4, 105-1, 105-2, 106-1, 106-2, and 107.

Figure 2:
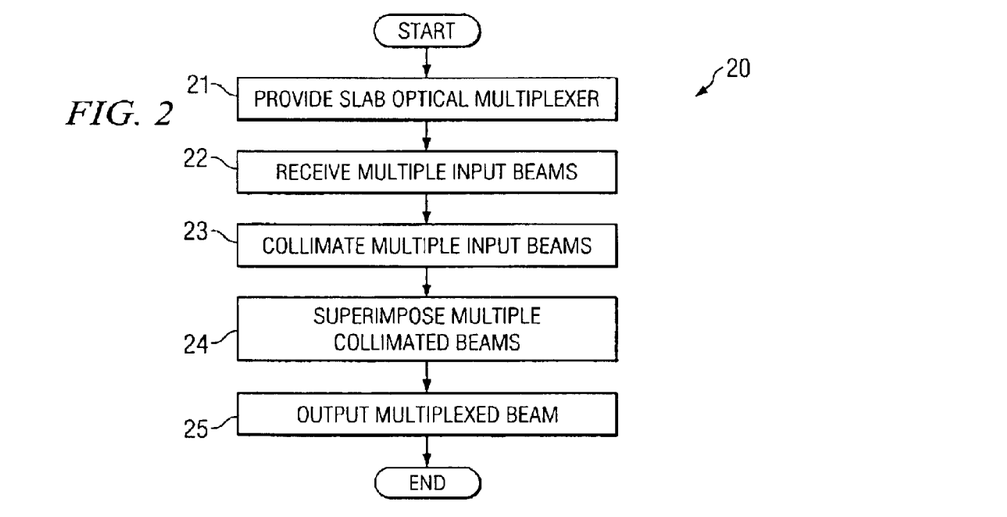
FIG. 2 is a simplified flow diagram depicting operations of a method of multiplexing input optical beams using the slab optical multiplexer of FIG. 1B, in accordance with the disclosed embodiments.

FIG. 2 is a simplified flow diagram depicting operations 20 of a method of multiplexing input optical beams using the slab optical multiplexer of FIG. 1B, in accordance with the disclosed embodiments. In operation 21, a slab optical multiplexer, for example slab optical multiplexer 10 illustrated in FIG. 1B, is provided. In operation 22, multiple input beams of differing wavelength to be multiplexed are received. In the example of FIG. 1B, four input beams 121–124 of respective wavelengths $\lambda_1, \ldots, \lambda_4$ are received from respective sources 11-1, . . . , 11-4. Sources 11-1, . . . , 11-4 can be, for example, optical fibers or diode emitters, such as vertical-cavity surface-emitting lasers (VCSELs) or edge-emitting lasers. In operation 23, multiple input beams, for example four input beams 121–124, are incident on collimating elements, for example lenses 103-1, . . . , 103-4, which collimate the individual input beams to form collimated beams, for example individual collimated beams 131–134 propagating within slab substrate 100. Distance L1 from sources 11-1, . . . , 11-4 to surface 101 of slab substrate 100 is generally in the range of 100 μm to 2,000 μm, and is typically about 500 μm.

In operation 24, all of the individual collimated beams are superimposed in the slab optical multiplexer to produce a single multiplexed beam, for example multiplexed beam 171. Each collimated beam is incident on a series of gratings and optical microstructures at surfaces 101, 102 of slab substrate 100. In the example of FIG. 1B, collimated beams are superimposed by pairs (131–132 and 133–134) to form intermediate superimposed beams 151, 152, which are eventually further superimposed by pairs to produce multiplexed beam 171.

Figure 3:
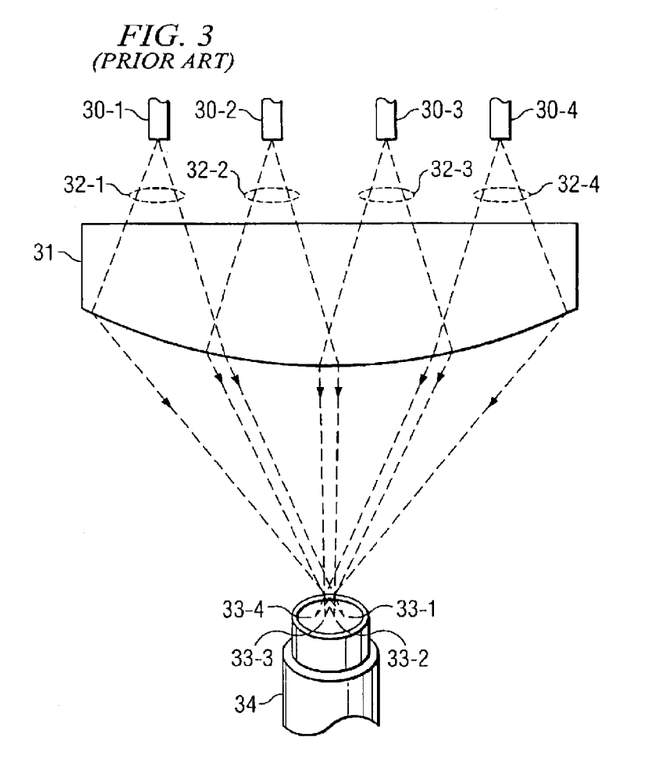
FIG. 3 is a schematic diagram illustrating by contrast a traditional multiplexing scheme, in which a large single lens collectively captures and focuses four input light beams.

FIG. 3 is a schematic diagram illustrating by contrast a traditional multiplexing scheme, in which a large single lens 31 collectively captures and focuses four input light beams 32-1, . . . , 32-4 from respective sources 30-1, . . . , 30-4. Lens 31 converges input light beams 32-1, . . . , 32-4 to four adjacent but not coincident focal points 33-1, . . . , 33-4, where they are captured by an optical fiber or optical sensor 34. Since collective focal points 33-1, . . . , 33-4 are considerably blurred over an extended area, optical fiber or sensor 34 must have a large capture cross-section, or else much of the input light can be lost.

Referring in more detail to FIG. 1B, collimated beams 131–134 propagate in the z-direction, as indicated by coordinate axes x, y, z, and are individually incident on respective micro-diffractive gratings 104-1, . . . , 104-4. If grating periodicity $\Lambda_1$ of micro-diffractive grating 104-1 is appropriately chosen for input wavelength $\lambda_1$, then collimated beam 131 is diffracted by micro-diffractive grating 104-1 into diffracted beam 141 at a predetermined angle directed toward micro-diffractive grating 105-1.

At micro-diffractive grating 105-1, applying the same principles of diffraction that were introduced in connection with FIG. 1A, diffracted beam 141 is further diffracted into intermediate superimposed beam 151. In the example depicted in FIG. 1B, diffracted beam 141 is incident on micro-diffractive grating 105-1 at an oblique incident angle relative to the normal. Because of the reciprocity principle of diffraction, by appropriate selection of grating periodicity $\Lambda_1$ relative to wavelength $\lambda_1$ and to incident angle, diffracted beam 141 is further diffracted by micro-diffractive grating 105-1 to propagate in the z-direction normal to the surface of micro-diffractive grating 105-1. As illustrated in the particular example of FIG. 1B, micro-diffractive gratings 104-1 and 105-1 are parallel to one another, and thus the diffracted angle of diffracted beam 141 at micro-diffractive grating 104-1 is equal to the incident angle of diffracted beam 141 at micro-diffractive grating 105-1. Since wavelength $\lambda_1$ is constant at both micro-diffractive gratings 104-1 and 105-1, then intermediate superimposed beam 151 will propagate in the z-direction parallel to collimated beam 131 if grating periodicity $\Lambda$ of micro-diffractive grating 105-1 is equal to grating periodicity $\Lambda_1$ of micro-diffractive grating 104-1. In addition to the above example, alternative geometric relationships can be devised.

Similarly, collimated beam 132 at input wavelength $\lambda_2$ is diffracted by micro-diffractive grating 104-2 into diffracted beam 142 directed toward micro-diffractive grating 105-1. Diffracted beam 142 is incident onto micro-diffractive grating 105-1 from a direction roughly symmetric to the incident angle of diffracted beam 141. Applying symmetry and reciprocity principles of diffraction, diffracted beam 142 is accordingly further diffracted into intermediate superimposed beam 151, thus becoming superimposed upon further diffracted beam 141. In the particular example depicted in FIG. 1B, by appropriate selection of grating periodicity $\Lambda$ relative to wavelength $\lambda_1$ and to incident angle, diffracted beam 142 is further diffracted by micro-diffractive grating 105-1 to propagate in the z-direction normal to the surface of micro-diffractive grating 105-1. As illustrated in the example of FIG. 1B, micro-diffractive gratings 104-2 and 105-1 are parallel, and thus the diffracted angle of diffracted beam 142 at micro-diffractive grating 104-2 is equal to the incident angle of diffracted beam 142 at micro-diffractive grating 105-1. Since wavelength $\lambda_2$ is slightly different from $\lambda_1$, and if additionally grating periodicity $\Lambda$ of micro-diffractive grating 104-2 is equal to grating periodicity $\Lambda_1$ of micro-diffractive gratings 104-1 and 105-1, then the incident angle of diffracted beam 142 at micro-diffractive grating 105-1 (equal to the diffracted angle of diffracted beam 142 at micro-diffractive grating 104-2) will likewise be slightly different from the incident angle of diffracted beam 141 at micro-diffractive grating 105-1 (equal to the diffracted angle of diffracted beam 141 at micro-diffractive grating 104-1). Nevertheless, diffracted beam 142 will be further diffracted by micro-diffractive grating 105-1 into intermediate superimposed beam 151, which comprises superimposed light of both wavelength components $\lambda_1$ and $\lambda_2$, and which propagates in the z-direction parallel to collimated beams 131 and 132. In addition to the above-described simple example, alternative geometric relationships can be devised.

Intermediate superimposed beam 151 is then incident normally onto micro-diffractive grating 106-1, which diffracts intermediate superimposed beam 151 into diffracted beam 161 directed onto micro-diffractive grating 107, in a manner similar to diffraction of collimated beam 131 by micro-diffractive grating 104-1. The diffractive angle illustrated at micro-diffractive grating 106-1 is greater than that at micro-diffractive grating 104-1. This can be accomplished either by using a finer grating periodicity $\Lambda < \Lambda_1$ or by using a higher diffractive order at micro-diffractive grating 106-1 relative to micro-diffractive grating 104-1. It is also noted that, since intermediate superimposed beam 151 superimposes light of two wavelength components $\lambda_1$ and $\lambda_2$, then, if micro-diffractive grating 106-1 has a single grating periodicity $\Lambda$, wavelength components $\lambda_1$ and $\lambda_2$ diffract at slightly different angles, thereby introducing divergence in diffracted beam 161.

The process described above is repeated by superimposing pairs of light beams within slab substrate 100. For example, collimated beam 133 at wavelength $\lambda_3$ is diffracted by micro-diffractive grating 104-3 into diffracted beam 143 directed toward micro-diffractive grating 105-2, and collimated beam 134 at wavelength $\lambda_4$ is diffracted by micro-diffractive grating 104-4 into diffracted beam 144 directed toward micro-diffractive grating 105-2. At micro-diffractive grating 105-2, diffracted beams 143 and 144 are superimposed by further diffraction into intermediate superimposed beam 152, in the same manner that diffracted beams 141 and 142 are further diffracted into intermediate superimposed beam 151 at micro-diffractive grating 105-1. Intermediate superimposed beam 152 is diffracted by micro-diffractive grating 106-2 into diffracted beam 162 directed onto micro-diffractive grating 107 in a manner similar to the diffraction of intermediate superimposed beam 151 into diffracted beam 161. Then, applying the same principles of diffraction as at micro-diffractive gratings 105-1 and 105-2, diffracted beams 161 and 162 are further superimposed by diffraction at micro-diffractive grating 107 into multiplexed beam 171, which consequently carries light of all four input wavelength components $\lambda_1, \ldots, \lambda_4$ as superimposed co-propagating beams.

Figure 4A:
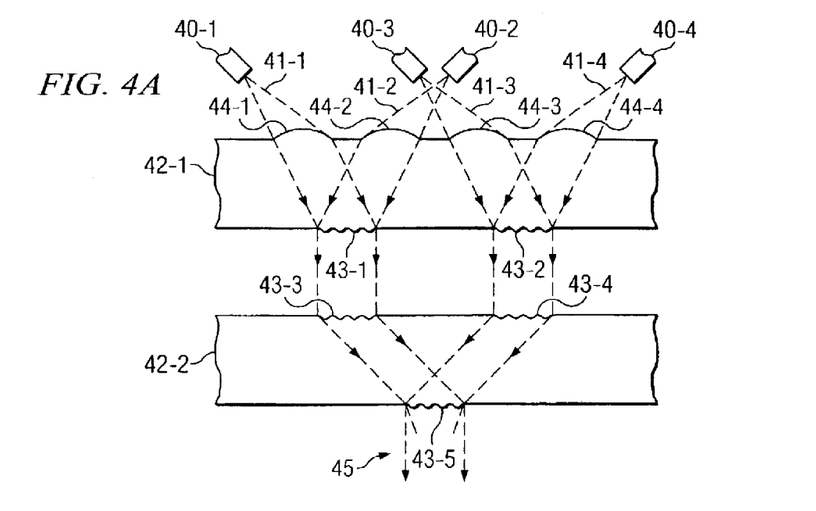
FIGS. 4A–4B are schematic diagrams depicting additional alternative embodiments.
Figure 4B:
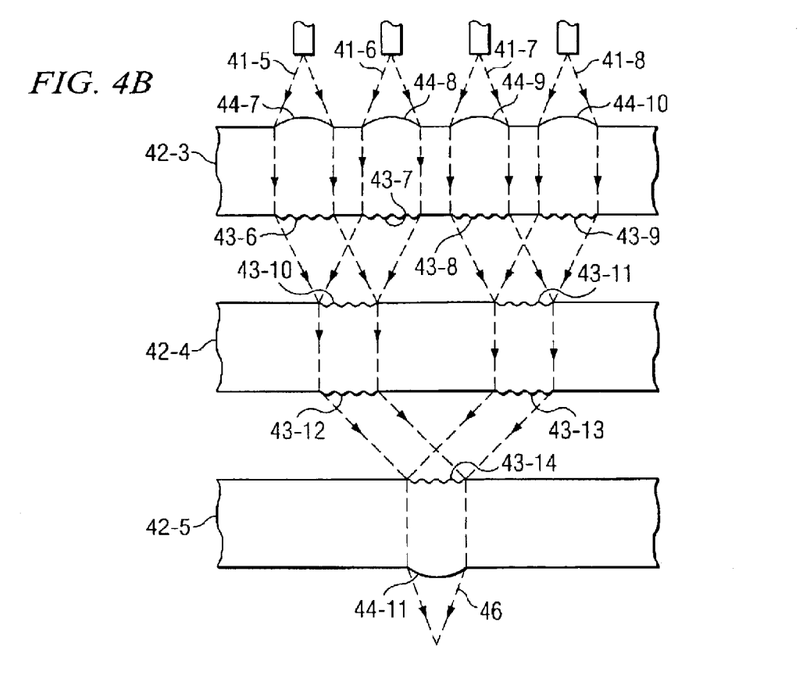

FIGS. 4A–4B are schematic diagrams depicting alternative embodiments, in which multiple input beams 41-1, ..., 41-8 are individually collimated into first slab substrates 42-1 and 42-3. In FIG. 4A, sources 40-1, ..., 40-4 are displaced off-axis relative to corresponding input collimating/focusing elements 44-1, ..., 44-4 at the input surface of first slab substrate 42-1, such that input beams 41-1, ..., 41-4 superimpose into intermediate beam pairs at non-normal incidence onto micro-diffractive gratings 43-1 and 43-2 at the exit surface of first slab substrate 42-1. The intermediate beam pairs diffracted from micro-diffractive gratings 43-1 and 43-2 then propagate normal to the exit surface through the space between first slab substrate 42-1 and second slab substrate 42-2, and are diffracted by micro-diffractive gratings 43-3 and 43-4 at the input surface of second slab substrate 42-2. The intermediate beam pairs then intersect at micro-diffractive grating 43-5, where they are diffracted into multiplexed output beam 45.

In FIG. 4B, input beams 41-5, ..., 41-8 are collimated by respective collimating/focusing elements 44-7, ..., 44-10 at the input surface of first slab substrate 42-3 and are individually normally incident onto and diffracted by first micro-diffractive gratings 43-6, ..., 43-9 at the exit surface of first slab substrate 42-3, such that the diffracted beams intersect non-normally and are diffracted into intermediate superimposed beam pairs by second micro-diffractive gratings 43-10 and 43-11 at the input surface of second slab substrate 42-4. The intermediate superimposed beam pairs propagate through and normal to the surfaces of second slab substrate 42-4. At the exit surface of second slab substrate 42-4, the intermediate superimposed beam pairs are diffracted by third micro-diffractive gratings 43-12 and 43-13 into the space between second slab substrate 42-4 and third slab substrate 42-5. The intermediate superimposed beam pairs intersect non-normally and are diffracted into multiplexed output beam 46 by fourth micro-diffractive grating 44-11 at the input surface of third slab substrate 42-5. Multiplexed output beam 46 propagates through third slab substrate 42-5 and can be focused by collimating/focusing element 44-11 at the exit surface of third slab substrate 42-5. The configurations illustrated in FIGS. 4A–4B can superimpose the four input beams in a more gradual series of operations than the embodiment illustrated in FIG. 1B, but accordingly require additional optical elements and alignment steps.

Referring again to FIG. 2, in operation 25, multiplexed beam 171 as shown is focused by final focusing element 108 to provide focused output beam 181 onto external optical element 110, for example an output optical fiber or optical detector, with a numerical aperture value nearly equal to that of each input beam 121–124. Alternatively, multiplexed beam 171 may emerge unfocused onto an external optical element as a collimated output beam, or may be further processed prior to emerging from slab optical multiplexer 10.

Figure 5A:
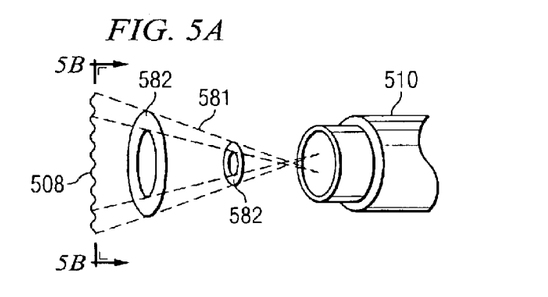
FIGS. 5A–5B are schematic diagrams illustrating a diffractive vortex lens as an example of a final optical element.
Figure 5B:
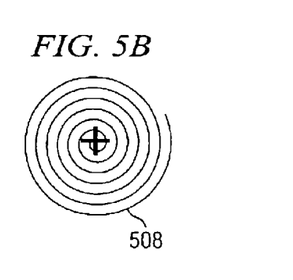

FIGS. 5A and 5B are schematic diagrams illustrating diffractive vortex lens 508 as an example of a final optical element in place of final optical element 108. Diffractive vortex lens 508 focuses output beam 581 to a ring shape 582 instead of a spot. Ring shape focused beam 582 can then be incident onto optical element 510, which can for example be a detector or an output optical fiber. Ring shape focused beam 582 concentrates light adjacent the outer walls of optical fiber 510, which is advantageous in the case of a multimode optical fiber, where there are fewer defects near the walls than along the axis.

The embodiment illustrated in FIG. 1B is capable of multiplexing an odd number of input beams. For example, if input source 11-4 at wavelength $\lambda_4$ is omitted, then wavelength component $\lambda_3$ propagates from input source 11-3 along the path described by beams 123, 133, 143, 152, and 162 without superimposing with a light beam of any other wavelength, and then finally superimposes at micro-diffractive grating 107 with beam 161 comprising superimposed wavelength components $\lambda_1$ and $\lambda_2$. Multiplexed beam 171 then comprises a superposition of three wavelength components $\lambda_1, \lambda_2,$ and $\lambda_3$. In a similar manner, embodiments as disclosed herein can provide multiplexing of two or any greater odd or even number of input beams into a single multiplexed output beam.

Advantageously, an embodiment based on the example illustrated in FIG. 1B can be configured to minimize divergence between the wavelength components in the multiplexed beam. Simulation results show, for example, that the initial micro-diffractive gratings, for example gratings 104-1, . . . , 104-4, encountered by each wavelength component, respectively $\lambda_1$, $\lambda_2$, $\lambda_3$, and $\lambda_4$, can have their respective grating periodicities $\Lambda_1$, $\Lambda_2$, $\Lambda_3$, and $\Lambda_4$ customized uniquely to each respective wavelength, such that the diffracted direction of final multiplexed beam 171 is identical for all four wavelength components $\lambda_1$, $\lambda_2$, $\lambda_3$, and $\lambda_4$. In this manner, pre-compensation is applied to an input beam of each wavelength component at initial micro-diffractive gratings 104-1, . . . , 104-4. Then, no divergence will occur between wavelength components $\lambda_1$, $\lambda_2$, $\lambda_3$, and $\lambda_4$ diffracted from final micro-diffractive grating 107, regardless of intermediate diffraction-induced beam divergence between the wavelength components $\lambda_1$, $\lambda_2$, $\lambda_3$, and $\lambda_4$ at any intervening micro-diffractive grating 105-1, 105-2, 106-1, and 106-2. This result applies over any range of input wavelength components, provided that each input wavelength component is separately incident on a unique initial grating. Particularly, the above result holds for wavelength components within the relatively limited wavelength range of current interest from about 1.2 $\mu$m to about 1.6 $\mu$m for applications related to optical telecommunications.

In an alternative embodiment, non-beam-superimposing micro-gratings 104-1, . . . , 104-4, and/or 106-1, 106-2, could be replaced with tilted flat deflecting mirrors. Although this would eliminate dispersion (divergence) at the flat mirror surfaces of beams having multiple wavelengths, the tilled-geometry mirrors may be more costly to fabricate than are the micro-diffractive gratings.

Figure 6A:
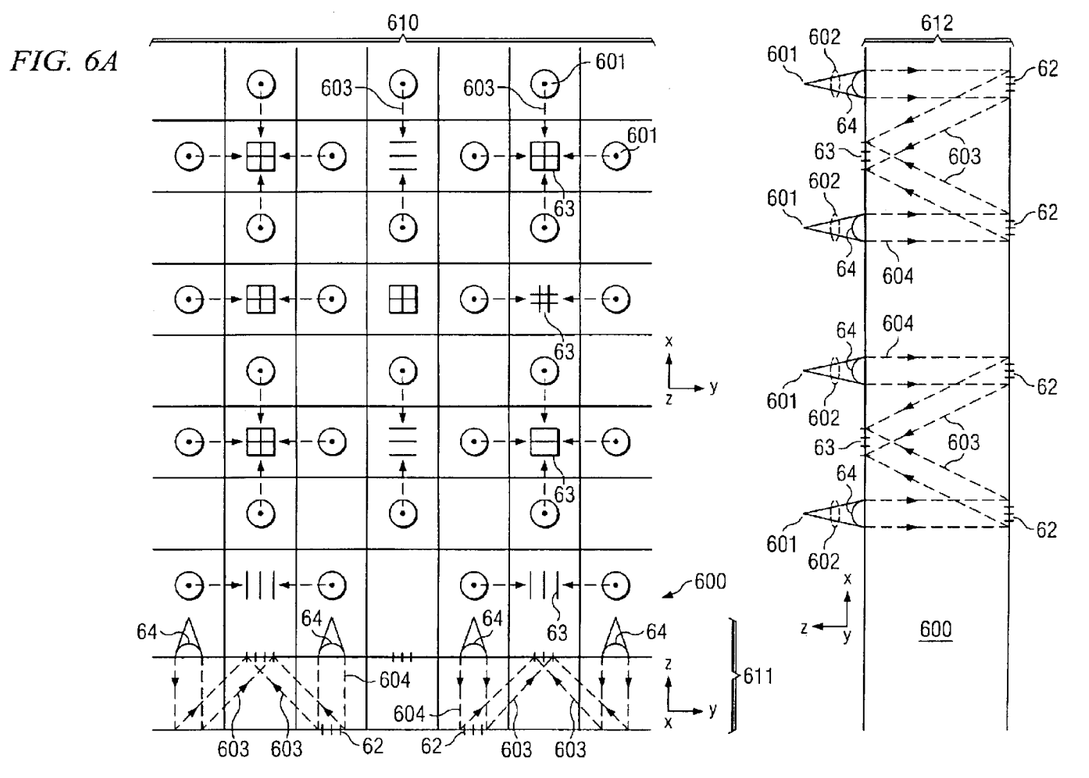
FIGS. 6A and 6B are schematic representations of embodiments having beam paths configured differently from that illustrated in FIG. 1B.
Figure 6B:
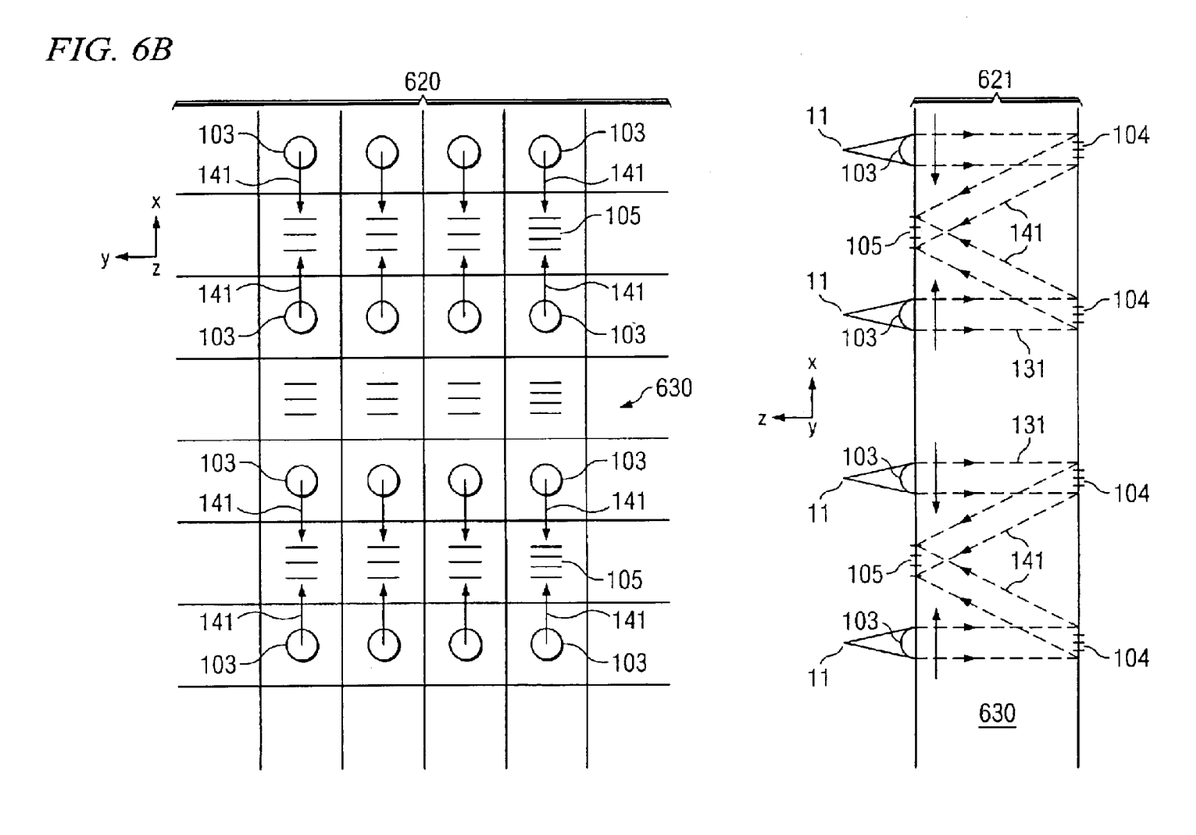

FIGS. 6A and 6B are schematic representations of embodiments having beam paths configured differently from that illustrated in FIG. 1B. In the alternative embodiment shown in FIG. 6A, beam paths are folded in the y-direction parallel to the plane of slab substrate 600, describing a complex three-dimensional folded-beam configuration. In FIG. 6A, xy plan view 610, zy end view 611, and xz side view 612 of slab substrate 600 are depicted. Input beams 602 from sources 601 are collimated at the slab surface by collimating/focusing elements 64 into collimated beams 604 within slab substrate 600. Collimated beams 604 are then individually diffracted by micro-diffractive gratings 62 into folding beams 603 propagating in both x and y directions, which are then superimposed into diffracted co-propagating beam pairs at bi-gratings 63, which effectively comprise an orthogonal superposition of two single linear diffraction gratings. When light is incident on a bi-grating, a single diffractive order is diffracted into two directions in orthogonally oriented planes. The three-dimensional folded-beam structure of FIG. 6A provides a particularly compact beam multiplexing configuration, which can be especially advantageous for multiplexing a large number of input beams.

In an alternative embodiment depicted in FIG. 6B, arrays of input beam sources and corresponding arrays of multiplexed output beams are stacked in the y-direction, parallel to the plane of slab substrate 630. In FIG. 6B, xy plan view 620 and xz side view 621 of slab substrate 630 are shown. Input beams from multiple sources 11 are collimated at the slab substrate surface by collimating/focusing elements 103 into collimated beams 131 propagating in the z-direction within slab substrate 630. Collimated beams 131 are then individually diffracted by micro-diffractive gratings 104 into diffracted beams 141 that do not propagate in the y-direction. Diffracted beams 141 are then superimposed into diffracted co-propagating beam pairs by micro-diffractive gratings 105, which are similar to micro-diffractive gratings 105-1, 105-2, described in connection with FIG. 1B. The configuration illustrated in FIG. 6B enables an entire array of input beams to be multiplexed simultaneously in parallel. For example, the configuration of FIG. 1B could be stacked 12 times in the y-direction, comprising, for example, a two-dimensional array of 4×12 VCSELs or other input beam sources, multiplexing into a 1×12 parallel array of output optical fibers. Although FIG. 1B suggests a configuration in which the light sources of different wavelengths are arranged in a linear array, with these arrays repeated in the y-direction in a linear array for each output beam, the teachings of the embodiments disclosed herein apply in general to an array of arbitrary configuration, in which a general array of input beams of arbitrary configuration is mapped to another array of output beams of arbitrary configuration. The array of output beams may be configured as a linear array, such as a parallel optical-fiber ribbon, or as a two-dimensional array, such as an optical-fiber bundle.

In principle it is possible to use slab optical multiplexer 100 in the reverse direction to demultiplex an already-multiplexed beam. Referring again to FIG. 1A, this could be done, for example, by introducing a collimated, multiplexed beam containing two wavelength components along the reverse direction of multiplexed output beam 191, and diffracting it into two separate beams at micro-diffractive grating 107. However, since micro-diffractive grating 107 cannot be blazed simultaneously for two diffracted angles, there will be an ambiguity in the diffracted angle of each of the wavelength components in the multiplexed input beam. Consequently, both of the closely-spaced wavelength components are nearly equally diffracted into various diffractive angles at diffractive grating 107. This results in substantial overlap and incomplete separation of the wavelength components. This poor demultiplexing efficiency can be overcome only partially by exploiting the slight difference in focal position between the two wavelength components when the original multiplexed beam or any beam diffracted from it is focused.

What is claimed is:

1. A slab optical multiplexer, comprising:
   a slab substrate internally propagating light beams, said slab substrate having two substantially flat and parallel surfaces;
   at least one collimating/focusing optical elements positioned in at least one of said light beams on each of said surfaces; and
   at least one micro-diffractive optical elements positioned in at least one of said light beams on each of said surfaces;
   wherein at least one said micro-diffractive optical element is positioned in two separately incident and intersecting said light beams, such that said two separately incident said light beams are diffractively reflected into a pair of co-propagating diffracted light beams.

2. The slab optical multiplexer of claim 1 wherein said slab substrate comprises a material selected from glass, optical grade polymer, silicon (Si), silicon dioxide ($SiO_2$), indium phosphide (InP), and gallium arsenide (GaAs).

3. The slab optical multiplexer of claim 1 wherein at least one said collimating/focusing optical element is positioned to collimate an input light beam incident externally on said slab substrate.

4. The slab optical multiplexer of claim 1 wherein at least one said collimating/focusing optical element is positioned to focus said pair of co-propagating diffracted light beams.

5. The slab optical multiplexer of claim 1 wherein said micro-diffractive optical elements are positioned to further superimpose said pairs of co-propagating diffracted light beams.

6. The slab optical multiplexer of claim 1 wherein said at least one said micro-diffractive optical element is configured to precompensate for diffraction-induced divergence within said pair of co-propagating diffracted light beams.

7. The slab optical multiplexer of claim 1 further comprising at least one mirror positioned in said light beam on said surface, such that said at least one mirror deflects said light beam.

8. A method of multiplexing input light beams of differing wavelengths, said method comprising:

provi­ding a slab of material comprising opposed major surfaces;

receiving separate and intersecting externally incident input light beams of differing wavelengths; and diffractively reflecting two said separate and intersecting externally incident light beams at said major surfaces of said slab into a superimposed pair of co-propagating diffracted light beams containing superimposed wavelength components of said two externally incident input light beams.

9. The method of claim 8 wherein said externally incident input light beam is received from an input optical fiber.

10. The method of claim 8 wherein said externally incident input light beam is received from a source selected from optical fibers, diode emitters, vertical-cavity surface-emitting lasers (VCSELs), and edge-emitting lasers.

11. The method of claim 8 further comprising collimating said externally incident input light beam.

12. The method of claim 8 further comprising further superimposing said superimposed pairs of co-propagating diffracted light beams.

13. The method of claim 8 further comprising precompensating said externally incident input light beam at said major surfaces of said slab to minimize divergence between wavelength components of said superimposed pair of co-propagating diffracted light beams.

14. The method of claim 8 further comprising outputting said superimposed pair of co-propagating diffracted light beams onto an external optical element selected from output optical fibers and optical detectors.

15. A method of fabricating a slab optical multiplexer, said method comprising:

providing a slab substrate of optically transmissive material, said slab substrate having flat and parallel opposing surfaces; and forming at least one micro-optical elements at each of said parallel surfaces, said micro-optical elements comprising collimating/focusing elements and micro-diffractive optical elements;

at least one said collimating/focusing optical element formed in at least one of said surfaces; and at least one micro-diffractive optical element formed in at least one of said surfaces;

wherein at least one said micro-diffractive optical element is operable simultaneously to diffractively reflect two separately incident and intersecting light beams into a pair of co-propagating diffracted light beams.

16. The method of claim 15 wherein said optically transmissive material is selected from glass, optical grade polymer, silicon (Si), silicon dioxide ($SiO_2$), indium phosphide (InP), and gallium arsenide (GaAs).

17. The method of claim 15 wherein a plurality of said micro-optical elements is formed at said surfaces using wafer-scale mass fabrication technology, such that multiple micro-optical elements are simultaneously pre-positioned and pre-aligned using a single mask patterning and alignment operation.

18. The method of claim 17 wherein said collimating/focusing element is formed by operations comprising:

depositing a layer of resist on said slab substrate surface;

exposing said deposited resist layer through a patterned mask, thereby producing a cylindrical resist post; and flowing said resist post to form a substantially hemispherical mound of resist.

19. The method of claim 18 wherein said collimating/focusing element is formed by operations further comprising transferring the shape of said substantially hemispherical mound into said underlying slab substrate surface using an anisotropic etch process.

20. The method of claim 17 wherein said micro-optical element is formed by operations comprising:

applying a plastic layer to said slab substrate surface; and transferring a replica impression of said collimating/focusing element into said applied plastic layer.

21. The method of claim 17 wherein said micro-diffractive optical element is formed by operations comprising:

depositing a resist layer on said slab substrate surface; and exposing said deposited resist layer through a patterned mask.

22. The method of claim 21 wherein said micro-diffractive optical element is formed by operations further comprising transferring the shape of said patterned resist into said slab substrate surface using an anisotropic etch process.

23. The method of claim 22 wherein said micro-diffractive optical element is formed by operations further comprising iterations of said exposing and transferring operations, using a different mask at each said iteration.

24. The method of claim 17 wherein at least one said micro-diffractive optical element is configured to precompensate for divergence between wavelength components of a multiplexed light beam.

25. The method of claim 15 wherein said parallel surfaces are separated by a slab substrate thickness having sub-millimeter dimensions.

* * * * *